C. W. F. STEINMANN.
CENTRIFUGAL GRAIN DRIER.
APPLICATION FILED OCT. 29, 1907.
930,898.
Patented Aug. 10, 1909.
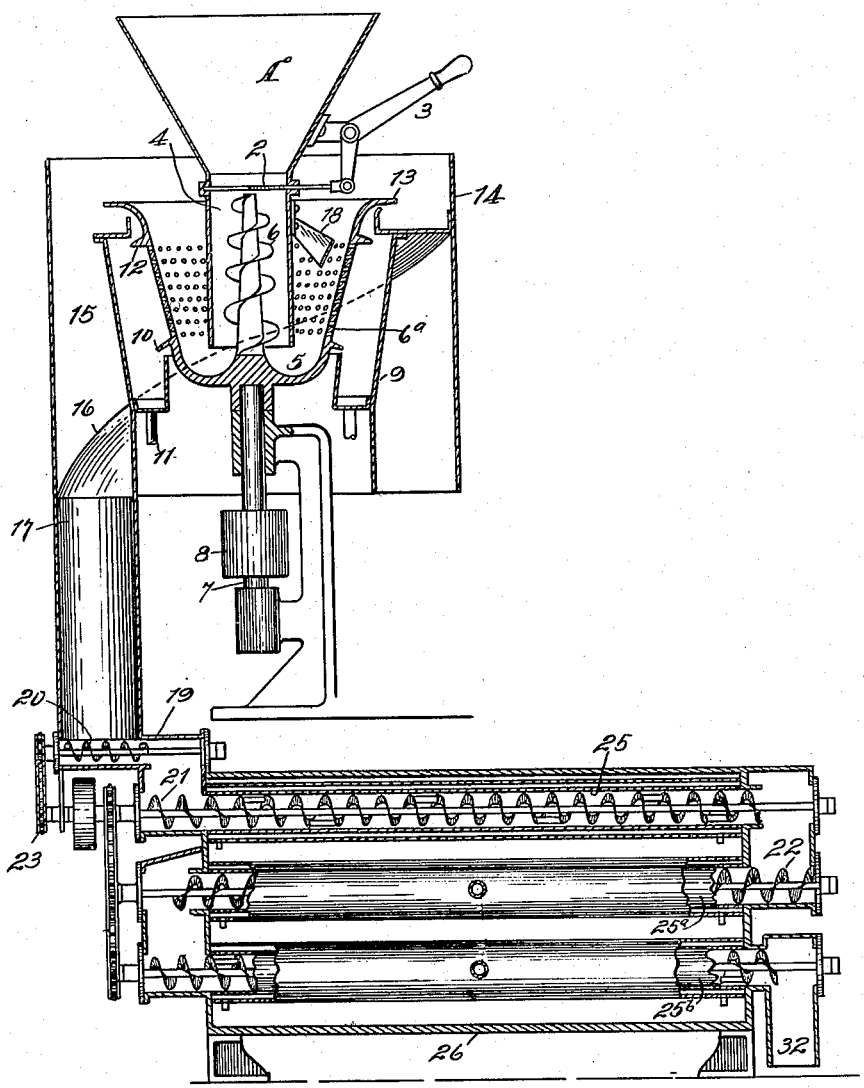

UNITED STATES PATENT OFFICE.

CHARLES W. F. STEINMANN, OF SAN FRANCISCO, CALIFORNIA.

CENTRIFUGAL GRAIN-DRIER.

No. 930,898.  Specification of Letters Patent.  Patented Aug. 10, 1909.

Application filed October 29, 1907. Serial No. 399,716.

*To all whom it may concern:*

Be it known that I, CHARLES W. F. STEINMANN, citizen of the United States, residing in the city and county of San Francisco and State of California, have invented new and useful Improvements in Grain and Like Drying Apparatus, of which the following is a specification.

My invention relates to improvements in apparatus for drying grains and like substances, such as the products left from malting, and the preparation of such grains to be fed to cattle, or for other and similar purposes.

It consists in the combination of parts, and in details of construction, which will be more fully explained by reference to the accompanying drawings, in which the figure is a vertical longitudinal sectional view of the apparatus.

It is the object of my invention to provide an apparatus for the separation and extraction of moisture from grain, or refuse or malting operations, whereby the grain is dried and prepared for feeding to cattle, or for other purposes.

The grain or material to be dried is first placed in a storage hopper A, which is here shown in a vertical position, having a gate 2; and by means of a lever 3 and suitable connections the gate may be opened or closed at will. After passing through the gate, the material is discharged into a vertical chute 4, from which it is delivered into the annular concave bottom 5, which forms the lower part of the conical revoluble separator. The center of this bottom extends upwardly, as shown, and carries upon its upper end a spiral or screw 6, here shown as tapering, the upper end extending up within the vertical chute to a point near the valve 2. By the revolution of this screw, the grain or material is caused to move downward by the positive action, and any tendency to cake or clog is prevented. From the concave bottom 5 the material is acted upon by the centrifugal force.

The separator is mounted upon a vertically journaled shaft 7, and by means of a pulley, as at 8, power may be transmitted to revolve the apparatus at any desired speed. The sides 6ª of the separator are here shown as divergent and perforated with holes, so that as the grain rises over these sides, the moisture within it is extracted and thrown outwardly through the openings. Surrounding this centrifugal portion is a casing 9, into which the moisture is received. The inner edge of the casing extends upwardly outside of the bottom 5, and by means of an inclined annular flange 10, moisture will be diverted into the bottom of the casing, and may thence be drawn off through drains, as at 11.

12 is an outwardly projecting flange carried by the centrifugal pan, and projecting so that any tendency of the moisture to creep upwardly after having been discharged by the perforation will be prevented, and this moisture will be caused to drop down within the casing 9.

The material still passing upward above the openings in the sides 6ª will be diverted outwardly by a divergent flange 13, and passing over the edge of this device, it will fall into the upper part of an inclosing casing 14, thence passing down into the annular chamber 15 which surrounds the casing 9. Within this chamber 15 is an inclined floor 16, which follows the curvature of the chamber and discharges outwardly through a passage, as at 17.

18 is a scraper suitably fixed with relation to the revoluble separator, and projecting toward the sides 6ª thereof, so that as the separator revolves, any tendency of the material to become massed or caked together will be prevented, and the material will be separated and caused to rise to the discharge over the rim 13, as previously stated. The whole of this portion of the apparatus may be supported upon a suitable frame-work, as shown.

The material being deprived of a great deal of its moisture, may then be delivered into a receiver, as at 19, and by means of a revoluble auger 20 the material is discharged into the trough of a revoluble auger or screw 21, which carries it along in a horizontal direction until it passes through an opening beyond the end of the auger channel, and falls into another channel within which revolves a conveying auger 22. These augers are caused to revolve by sprockets and chains, as at 23.

The cylinders or channels through which the grain is conveyed, are here shown as three in number, as at 25—25ª—25ᵇ, each having a spiral worm or auger revoluble in it. The cylinders are mounted in an appropriate casing 26, and one cylinder delivers to another through suitable end passages, shown and the final cylinder delivers into a final discharge 32.

The foregoing brief description may represent any form of drier with which the centrifugal separator may be associated to carry out the purposes of my present invention.

Having thus described my invention, what I claim and desire to secure by Letters Patent is—

1. An improved drying apparatus including a revoluble pan having upwardly diverging perforated sides and a concaved bottom, a vertically disposed screw extending upwardly from the center of the pan and revoluble therewith and adapted to feed the material downwardly toward the bottom of the pan by direct action, an inclosing chute through which the material is delivered around the screw and into the bottom of the pan, a stationary scraper extending into the pan, a moisture receiving casing surounding the perforated portion of the pan, an independent receiver surrounding the upper periphery of the pan, into which receiver the grain is delivered, an inclined spiral extending from said casing around the pan, an exterior casing having an outlet to which the spiral leads the material, a heat applying and agitating mechanism to which the material is delivered, and means whereby the material is continuously acted upon to first deprive it of excess of free moisture, and then to reduce it to a dry mass.

2. In an apparatus of the character described, a revoluble pan having a concave bottom, divergent, perforated sides and moisture controlling flanges upon the exterior above and below the perforations, a vertically disposed screw extending upwardly from the center of the pan and revoluble therewith, an inclosing chute through which material is delivered around the screw and into the bottom of the pan, to be carried upwardly by centrifugal force, a stationary scraper extending into the pan, a moisture receiving casing surrounding the perforated portion of the pan, an independent receiver surrounding the upper periphery of the pan, into which receiver the grain is delivered, and an inclined spiral extending from said casing around the pan and downwardly to a discharge opening.

In testimony whereof I have hereunto set my hand in presence of two subscribing witnesses.

CHARLES W. F. STEINMANN.

Witnesses:
 GEO. H. STRONG,
 C. A. PENFIELD.